Sept. 10, 1968

H. ALMGREN 3,400,794

SELECTIVE MULTIPLE CLUTCH

Filed June 20, 1966

INVENTOR.
HARALD ALMGREN
BY
Young + Thompson
ATTYS.

United States Patent Office 3,400,794
Patented Sept. 10, 1968

3,400,794
SELECTIVE MULTIPLE CLUTCH
Harald Almgren, Roslags-Nasby, Sweden, assignor to
Blomqvists Verkstadsaktiebolag
Filed June 20, 1966, Ser. No. 558,766,
Claims priority, application Sweden, July 1, 1965,
8,714/65
4 Claims. (Cl. 192—48.91)

ABSTRACT OF THE DISCLOSURE

Either of two rotatable members may be selectively coupled to a shaft by means of a clutch in the form of a semicircular plate radially disposed in a slot in the shaft and having teeth that mesh with teeth on an axially slidable control rod within the shaft, so that upon movement of the control rod in either direction, one end or the other of the semicircular segment will project out of the shaft slot into a radially disposed slot in the one of the two rotatable members that it is desired to engage for rotation with the shaft.

---

This invention relates to a mechanism for alternatively locking a rotary shaft to either of two parts, such as wheels, rotatably mounted on the shaft.

In certain cases the dimensions of a machine construction are relatively limited. For this reason considerable difficulties in construction and increased costs are likely to occur if a machine element has to be chosen which must be comparatively large for reasons of strength, resulting in unnecessarily large dimensions of one or more other portions of the construction. This applies for instance to shifting mechanisms for gear transmissions. In particular the invention relates to a shifting mechanism for two wheels rotatably mounted on a rotary, preferably driving shaft and the object of the invention is to provide a mechanism of this kind which is comparatively compact and in a relatively small degree affects the strength of the rotary shaft so that the diameter of this shaft need not be unnecessarily great.

To attain this object the mechanism according to the invention is characterized by the features indicated in the annexed claims.

A suitable embodiment of the invention is illustrated in the annexed drawing.

Figure 1:
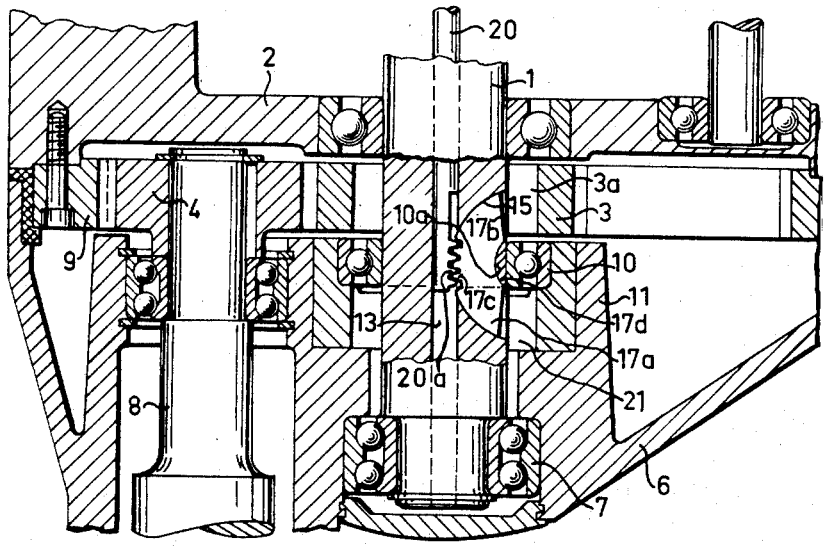
Figure 2:
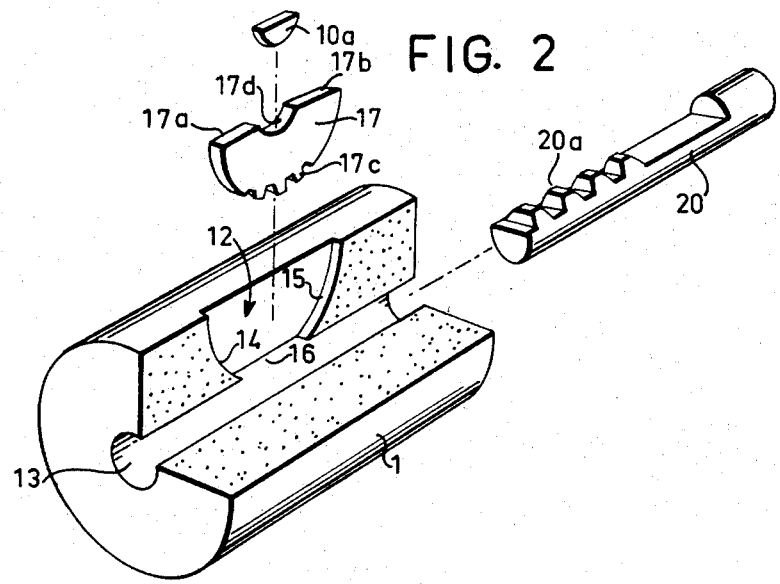

FIG. 1 is an axial sectional view of the rotary head of a bakery machine comprising a planetary gearing and the driving shaft of which can be alternatively locked to the sun gear or the planet carrier of the planetary gearing in order to obtain two different speeds. FIG. 2 is a diagrammatic exploded view of the essential parts of the invention.

Reference numeral 1 denotes the driving shaft which is mounted in a stationary casing 2. Mounted on the shaft is a sun gear 3 in mesh with a planet gear 4 supported by a planet carrier 6 which is mounted by a bearing 7 at the lower end of the shaft 1. The planet gear is rigidly connected with a tool holder 8 which rotates about its own axis and at the same time circles about the shaft 1.

The planet gear 4 rolls on a toothed ring secured to the casing and having internal teeth 9.

The planet carrier 6 is mounted on two ball bearings 7 and 10 provided on the shaft 1.

In FIG. 1 the shaft 1 is disengaged both from the gear 3 and the carrier 6. For locking the shaft to the gear 3 or to the hub 11 of the carrier there is provided the following mechanism.

The shaft has a slot or groove 12 milled by means of a cutter and extending as far as to a central bore 13 in the shaft. Consequently, the slot has two parallel side walls and two opposed end walls 14, 15 in the form of arcs of a circle, said end walls extending down to the opening 16 between the slot or groove 12 and the bore 13.

Mounted in the slot is a plate-like segment 17 which in FIG. 1 is in disengaged position. At its periphery the segment has teeth 17c in mesh with corresponding teeth 20a on a control rod 20 which is displaceable in the bore 13 for adjusting the segment into a desired angular position.

In FIG. 1 the ends 17a, 17b of the segment are completely received within the groove 12.

In order to retain the segment in the groove 12, it has a cylindrical central recess 17d in engagement with a small cross piece 10a which is in contact with the inner ring of the ball bearing 10 or with another ring.

The gear 3 has one or more axial grooves 3a of substantially the same width as the groove 12 so as to form at least one recess into which the adjacent end 17b of the segment 17 can enter so as to be locked to the gear 3.

Similarly, the hub 11 has one or more axial grooves 21 for forming at least one recess into which the adjacent end 17a of the segment can enter so as to be locked to the planet carrier.

As will be seen from FIG. 1, the axial length of the groove 12 is only slightly greater than the sum of the lengths of the end portions 17a, 17b of the segment, this being possible due to the fact that the locking means is adjusted substantially radially as distinguished from conventional shifting mechanisms in which the corresponding movement is an axial one.

Since the strength of the shaft 1 would be weakened by an axial groove which is located near the periphery of the shaft and is considerably longer than the length of the groove according to the invention, the mechanism illustrated in the drawing results in that the weakening of the shaft due to the groove 12 is comparatively inconsiderable so that the increase of the diameter can be kept within limits which do not materially affect the construction as a whole.

The control rod 20 is inserted centrally into the shaft and, consequently, requires no space around the shaft.

A further advantage of the invention is that the groove 12 may be obtained in a simple manner by means of a cutter.

Due to the fact that the substantially half circular segment 17 has radial end edges, each end portion 17a, 17b of the segment will upon the initial coupling operation be brought to engagement along its whole radial length with one side of the recess 3a, or 21, respectively, and this means that a relatively great surface of the segment will immediately become effective for power transmission. Hence, the risk of damages on the member 3 and 11, respectively, at its recess 3a and 21, respectively, due to too high specific pressure during the initial coupling moment will be considerably reduced.

I claim:

1. In a motion-transmitting device including two individually rotatable members encompassing a rotatable shaft, the improvement comprising an arcuate segment radially disposed in an arcuate slot in the shaft, each of said two rotatable members having a radially disposed slot therein registrable with said slot in the shaft, said segment having an intermediate position in which no portion of it is disposed in the slot of either of said rotatable members, said segment having oppositely rotated positions in which one portion or another of the segment is disposed in said slot of one said rotatable member or the other, said shaft having a central axial bore that communicates with the radially inner portion of said shaft slot, and a control rod in said axial bore and having portions thereof meshing with portions of said segment so that upon movement of said control rod said segment is rotated in one direction or the other.

2. A device as claimed in claim 1, said segment and control rod having teeth thereon that mesh with each other, said control rod being axially slidable in said bore to rotate said segment.

3. A device as claimed in claim 1, said shaft slot and said segment being subtantially semicircular.

4. A device as claimed as in claim 1, and a ball bearing on which one of said rotatable members is mounted, said ball bearing having an inner ring which surrounds the shaft and is disposed in a radial plane that includes the axis of rotation of said segment, and a loose crosspiece disposed in a recess at the center of rotation of said segment and disposed at least in part in said shaft slot, said crosspiece having a cylindrical bearing surface in contact with a cylindrical side wall of said segment recess, said inner ring of said ball bearing retaining said crosspece in said segment recess.

References Cited

UNITED STATES PATENTS 2,377,575  6/1945  Ringer _____ 192—48

BENJAMIN W. WYCHE, III, *Primary Examiner.*

L. J. PAYNE, *Assistant Examiner.*